United States Patent

Youn

Patent Number: 5,963,274
Date of Patent: Oct. 5, 1999

[54] VERTICAL/HORIZONTAL INTERPOLATION DEVICE AND METHOD IN CONVERGENCE SYSTEM

[75] Inventor: In Soo Youn, Seoul, Rep. of Korea

[73] Assignee: LG Electronics Inc., Seoul, Rep. of Korea

[21] Appl. No.: 09/048,243

[22] Filed: Mar. 26, 1998

[30] Foreign Application Priority Data

Mar. 29, 1997 [KR] Rep. of Korea ........... 97-11382

[51] Int. Cl.$^6$ ........................................... H04N 3/23
[52] U.S. Cl. ................................. 348/745; 348/806
[58] Field of Search ..................... 348/745, 746, 348/747, 806, 807; H04N 3/23, 3/233

[56] References Cited

U.S. PATENT DOCUMENTS 5,537,159  7/1996  Suematsu et al. ............... 348/745
5,790,210  8/1998  Kim et al. ........................ 348/807

*Primary Examiner*—Victor R. Kostak
*Assistant Examiner*—Sam Huang
*Attorney, Agent, or Firm*—Fleshner & Kim

[57] ABSTRACT

Vertical/horizontal interpolation device and method in a convergence system is provided that includes a horizontal high order interpolating part for conducting horizontal high order interpolations for convergence adjustment data of preset positions using received horizontal/vertical convergence adjustment data regardless of the modes. The modes can include, for example, overscan, underscan and 4:3 modes. An adjustment point processing part processes adjustment point data for convergence adjustment data of the preset positions of the received horizontal/vertical convergence adjustment data. A first horizontal first order interpolating part conducts horizontal first order interpolations for convergence adjustment data of the preset positions of the received horizontal/vertical convergence adjustment data in the overscan mode and the 4:3 mode and a second horizontal first order interpolating part conducts horizontal first order interpolations for convergence adjustment data of the preset positions of the received horizontal/vertical convergence adjustment data in the underscan mode. A vertical interpolation processing part selects an interpolated data in response to a mode selecting signal of interpolated data from each of the parts and conducts vertical first and high order interpolations for the selected vertical interpolation data of the horizontal/vertical convergence interpolated data, which was previously horizontally interpolated and adjustment point processed. Thus, the vertical/horizontal interpolation device and method performs effective interpolation for at least three modes using a simple hardware based system and method.

25 Claims, 7 Drawing Sheets position 0 1 2 3 4 5 6 7 8 9 10 11 12 13 14 15 position 0 1 2 3 4 5 6 7 8 9 10 11 12 13 14 15 position 0  1  2  3  4  5  6  7  8  9  10  11  12  13  14  15 position 0  1  2  3  4  5  6  7  8  9  10  11  12  13  14  15

VERTICAL/HORIZONTAL INTERPOLATION DEVICE AND METHOD IN CONVERGENCE SYSTEM

BACKGROUND OF THE INVENTION

1. Field of the Invention

The present invention relates to convergence system of a projection TV, and more particularly, to vertical/horizontal interpolation device and method for each mode in a convergence system.

2. Background of the Related Art

As shown in FIG. 1, different from a direct view TV, a first related art backward projection TV is provided with three CRTs 1 for respectively projecting beams of R, G and B and three projection lenses 2 for respectively enlarging the beams from the CRTs 1. A mirror 3 reflects the R, G and B beams enlarged from the projection lenses 2 in a direction and a screen forms an image of the R, G and B beams reflected by the mirror 3. A circuit (not shown) controls operation of the aforementioned parts.

In the first related art projection TV, electron beams of R, G and B are projected from the respective R, G and B CRTs 1 by the circuit (not shown) and respectively enlarged by the projection lens 2. The enlarged R, G, B electron beams are reflected by the mirror 3 and enlarged to project onto the screen 4. In this instance, mis-convergences occur as shown in FIG. 2 because of differences of the R, G and B beams in their incident angles to the screen 4. In convergence correcting circuits employed for correcting the mis-convergences, there are at large analog convergence correcting circuits and digital convergence correcting circuits. The digital convergence correcting circuit stores data between each of adjustment points on the screen 4 in a memory (not shown) for adjusting a convergence at each of the adjustment points on the screen 4. And, depending on the means of obtaining a correcting data required for a convergence from the adjustment point data, there are software based interpolations and hardware based interpolations. In the hardware based interpolations, the mis-convergences are corrected by applying appropriate vertical/horizontal correcting currents to each of the convergence yokes in the respective CRTs to adjust paths of electron beams.

FIG. 3 is a block diagram showing a second background art convergence system in a projection TV. The second background art convergence system includes a key part 10, a controlling part 20, an EEPROM 30, ASIC 40, PLL 50, D/A converting part 60, a sample and hold and LPF 70 and amplifying part 80. As shown in FIG. 4, the ASIC 40 is provided with a test pattern generating part 45 for generating test patterns in response to horizontal/vertical blanking signals H_BLK and V-BLK and a horizontal/vertical interpolating part 46 for making horizontal/vertical interpolation of horizontal/vertical adjustment points in the test patterns generated in the test pattern generating part 45. The horizontal/vertical interpolating 46 is provided with an HRAM (horizontal RAM) 41 for storing a horizontal adjustment point data in response to a control signal from the controlling part 20 and a horizontal interpolating part 42 for making a horizontal interpolation of the stored horizontal adjustment point data. A VRAM (vertical RAM) 43 stores a vertical adjustment point data of the horizontally interpolated horizontal/vertical adjustment point data, and a vertical interpolating part 44 makes a vertical interpolation of the stored vertical adjustment point data. The horizontal/vertical interpolating part 46 provides the horizontally and vertically interpolated horizontal/vertical adjustment point data to the D/A converting part 60. The amplifying part 80 is connected to CRTs 90, a mirror 100, and a screen 110, which are identical to the ones shown in FIG. 1.

The convergence adjustment operation of the second related art convergence system in a projection TV will now be described. Watching a displayed adjustment test pattern, a user or an adjuster, determines mis-convergences between R, G and B patterns of a spot or location, determines a direction of adjustment, and provides the direction to the controlling part 20 using the key part 10, i.e., a remote controller. The controlling part 20 stores the adjustment point data of the spot in a RAM (not shown) in the ASIC 40. The PLL part 50 receives the horizontal/vertical blanking signal H_BLK and V_BLK, generates a synchronous clock, provides the synchronous clock to the test pattern generating part 45 in the ASIC 40, and provides the vertical blanking signal H_BLK and V_BLK to the controlling part 20. The horizontal/vertical interpolating part 46 in the ASIC 40 uses the adjustment point data stored in the RAM for calculating horizontal/vertical correcting data. The horizontal/vertical correcting data are calculated by preset horizontal/vertical interpolating equations. Once calculated, the correcting data is provided to R, G and B, which are respectively three channels in the D/A converting part 60, in synchronization to the clock signal from the PLL 50.

The D/A converting part 60 then converts the received convergence correcting data into analog data and provides to the analog data to the sample and hold and LPF 70. The sample and hold and LPF 70 includes first and second sample and hold and LPF 71 and 72 for separately processing the horizontal/vertical correcting data. That is, the horizontal/vertical correcting data from the D/A converting part 60 are respectively separated for horizontal and vertical correcting data and low pass filtering in the first and second sample and hold and LPF 71 and 72, and then provided to the amplifying part 80. The amplifying part 80 uses the first and second amplifying parts 81 and 82 to respectively amplify the separated and low pass filtered horizontal and vertical correcting data in terms of current for driving the convergence yokes CY in the CRTs 90. The amplified horizontal and vertical correcting data are applied to horizontal/vertical convergence yokes in respective CRTs 90 separated by colors for adjusting paths of the electron beams. When the adjusted electron beams are reflected by the mirror 100 and enlarged/projected onto the screen 110, the convergence adjustment is complete. Once the convergence adjustment is completed to remove mis-convergences in the adjustment test pattern as described above, the controlling part 20 reads the final adjustment point data having been adjusted for convergence from the RAMs in the ASIC 40 and stores it in the EEPROM (Electrically Erasable Read Only Memory) 30, which is a non-volatile memory. A convergence adjustment for one mode is thus completed. All the images subsequently received are convergence adjusted according to the adjustment point data stored in the EEPROM 30.

In the meantime, a test pattern displayed on the screen 110 differs in the convergence adjustments depending on modes as shown in FIGS. 5a~5c. The modes include overscan mode, underscan mode and 4:3 mode. A number of the convergence adjustment points and corresponding positions differ depending on the three modes. As shown in FIGS. 5a~5c, "x" marks represent the convergence adjustment points. In the case of the overscan mode, the number of convergence adjustment points is 35 as shown in FIG. 5a. In the case of the 4:3 mode, the number of convergence adjustment points is 45 as shown in FIG. 5b. In the case of the underscan mode, the number of convergence adjustment points is 45 as shown in FIG. 5c, From these adjustment points, convergence horizontal interpolation data for 80 points as shown in FIG. 5d are calculated using horizontal interpolation equations (i.e., equations 1~12) described below. From the convergence horizontal interpolation data for the 80 points, final convergence data to be presented for all fields can be obtained by using vertical interpolation equations (i.e, equations 13~19) described below. In screens, which are represented in FIGS. 5a, 5b and 5c with a thick solid line, points within the screens at which precise horizontal/vertical interpolations are desirable are high order interpolated, while points outside of the screens at which precise horizontal/vertical interpolations are required are first order interpolated. Differences according to the modes will now be described.

In the case of the overscan mode, an image is projected a little larger than actual screen as in a general TV signal. In overscan, positions 2, 4, 6, 8, 10, 12 and 14 are the adjustment points, positions within the screen 3, 5, 7, 9, 11 and 13 are high order interpolated and positions 0, 1 and 15 outside of the screen are first order interpolated to obtain 80 horizontal interpolation data as shown in FIG. 5d. The overscan mode is shown in FIG. 5a.

In the case of the underscan mode, an image is projected a little smaller than actual screen as in a PC signal. In underscan mode, positions 1, 2, 4, 6, 8, 10, 12, 14 and 15 are the adjustment points, positions 3, 5, 7, 9, 11 and 13 within the screen are high order interpolated and a position 0 outside of the screen is first order interpolated to obtain 80 horizontal interpolated data as shown in FIG. 5d. The underscan mode is shown in FIG. 5c.

In the case of the overscan mode, positions 3 and 13 on opposite sides of the screen may be difficult to adjust because of deflection of the electron beams. The 4:3 mode adds adjustment points around these locations. The 4:3 mode is shown in FIG. 5b. In the case of 4:3 mode, positions 2, 3, 4, 6, 8, 10, 12, 13 and 14 are the adjustment points, positions 5, 7, 9 and 11 within the screen are high order interpolated and positions 0, 1 and 15 outside of the screen are first order interpolated to obtain 80 horizontal interpolation data as shown in FIG. 5d.

This can be summarized as follows:

(1) Overscan Mode,

| | |
|---|---|
| positions 3, 5, 7, 9, 11 and 13 | (high order interpolation), |
| positions 0, 1 and 15 | (first order interpolation), |
| positions 2, 4, 6, 8, 10, 12 and 14 | (adjustment points); |

(2) Underscan Mode,

| | |
|---|---|
| positions 3, 5, 7, 9, 11 and 13 | (high order interpolation), |
| position 0 | (first order interpolation), |
| positions 1, 2, 4, 6, 8, 10, 12, 14 and 15 | (adjustment points); and |

(3) 4:3 Mode,

| | |
|---|---|
| positions 5, 7, 9 and 11 | (high order interpolation), |
| positions 0, 1 and 15 | (first order interpolation), |
| positions 2, 3, 4, 6, 8, 10, 12, 13 and 14 | (adjustment points). |

In the horizontal interpolation equations:

$$A = \frac{(y_0 - 6y_1 + 15y_2 - 20y_3 + 15y_4 - 6y_5 + y_6)}{64} \quad (1)$$

$$B = \frac{(-y_0 + 4y_1 - 5y_2 + 5y_4 - 4y_5 + y_6) \times 3}{64} \quad (2)$$

$$C = \frac{(-y_0 + 12y_1 - 39y_2 + 56y_3 - 39y_4 + 12y_5 - y_6)}{16} \quad (3)$$

$$D = \frac{(y_0 - 8y_1 + 13y_2 - 13y_4 + 8y_5 - y_6)15}{8} \quad (4)$$

$$E = \frac{(2y_0 - 27y_1 + 270y_2 - 490y_3 + 270y_4 - 27y_5 + 2y_6)2}{4} \quad (5)$$

$$F = \frac{(-y_0 + 9y_1 - 45y_2 + 45y_4 - 9y_5 + y_6)12}{2} \quad (6)$$

$$G = y_3 \quad (7)$$

$$p(x) = \frac{(Ax^6 + Bx^5 + Cx^4 + Dx^3 + Ex^2 + Fx)}{720} + G \quad (8)$$

$$y_{15} = y_{12} + 3/2 \times (y_{14} - y_{12}) \quad (9)$$

$$y_0 = y_{15} + 1/3 \times (y_2 - y_{15}) \quad (10)$$

$$y_1 = y_{15} + 2/3 \times (y_2 - y_{15}) \quad (11)$$

$$y_0 = 1/2 \times (y_0 + y_{15}) \quad (12)$$

In the equations (1)–(7), $y_0$~$y_7$ are the seven data in a horizontal line in convergence data provided to the EEPROM 30. Equation (8) is a horizontal 6th order interpolation equation for a high order interpolation. Equations (9)–(11) are horizontal first order interpolation equations for overscan and 4:3 modes and equation (12) is a horizontal first order interpolation equation for an underscan mode. The $y_0$, $y_1$, $y_{12}$, $y_{14}$ and $y_{15}$ in equations (9)–(12) represent positions 0, 1, 12, 14 and 15 on the screen, respectively.

In the vertical interpolation equations, $$a = y_0 - 4y_1 + 6y_2 - 4y_3 + y_4 \quad (13)$$

$$b = -y_0 + 4y_1 - 4y_3 + y_4 \quad (14)$$

$$c = -y_0 + 16y_1 - 3y_2 + 4y_3 - y_4 \quad (15)$$

$$d = y_0 - 8y_1 + 8y_3 - y_4 \quad (16)$$

$$p(x) = y_2 + \frac{xd}{12h} + \frac{x^2c}{24h^2} + \frac{x^4a}{12h^4} + \frac{x^3b}{12h^3} \quad (17)$$

$$\text{Upper) } y = \frac{y_1 - y_0}{h}(VA - z) + y_0 \quad (18)$$

$$\text{Lower) } y = \frac{y_4 y_3}{h}(VA - (m + z)) + y_3 \quad (19)$$

In the equations (13)–(19), $y_0$~$y_4$ are five data in a vertical line in the convergence data in which horizontal interpolation has been completed. Equation (8) is a vertical fourth order interpolation equation for high order interpolation. In the equations (18) and (19), which are for making vertical first order interpolation for the first order interpolation regions, VA represents a scanning line, "m" represents a number of scanning lines in a high order interpolation, "z" represents a number of scanning lines in a first interpolation, and "h" represents a distance between adjacent adjustment points.

A third related art system for performing the horizontal/vertical interpolations according to the modes is illustrated in FIG. 6. Referring to FIG. 6, a third related art hardware system is provided with an HRAM 41, a first horizontal interpolating part 42-1, a second interpolation part 42-2, a third interpolating part 42-3, a multiplexer 42-4, a VRAM 43 and a vertical interpolating part 44. The first horizontal interpolating part 42-1 is provided with a first horizontal first order interpolating part 42a for conducting a horizontal first order interpolation and a first horizontal high order interpolating part 42b for conducting a horizontal high order interpolation in an overscan mode. The second horizontal interpolating part 42-2 is provided with a second horizontal first order interpolating part 42c for conducting a horizontal first order interpolation and a second horizontal high order interpolating part 42d for conducting a horizontal high order interpolation in an underscan mode. The third horizontal interpolating part 42-3 is provided with a third horizontal first order interpolating part 42e for conducting a horizontal first order interpolation and a third horizontal high order interpolating part 42f for conducting a horizontal high order interpolation.

The operation of the third related art system for adjusting a convergence will now be described. Horizontal/vertical convergence adjustment point data in one of the overscan mode, the underscan mode and the 4:3 mode is stored in the HRAM 41 through the test pattern generating part 45. If the third related art convergence adjusting device is in an overscan mode, vertical/horizontal adjustment point data in the overscan mode is provided to the first horizontal interpolating part 42-1 through the HRAM 41. Then, the first horizontal first/high order interpolating parts 42a and 42b in the first horizontal interpolating part 42-1 conduct horizontal first/high order interpolations according to the horizontal interpolating equations (equations 1 to 12) and provide results to the multiplexer 42-4. The multiplexer 42-4 selects the horizontally interpolated horizontal/vertical convergence data in the overscan mode in response to a mode selecting signal (i.e., an overscan mode selecting signal) and provides them to the vertical interpolating part 44 through the VRAM 43. The vertical interpolating part 44 conducts vertical first/high order interpolations for the vertical convergence data of the horizontally interpolated horizontal/vertical convergence data using the vertical first order interpolating part 44a and the vertical high order interpolating part 44b according to the vertical interpolating equations(equations 13~19) and provides results to the D/A converting part 60 shown in FIG. 4.

When vertical/horizontal convergence adjustment point data in the underscan mode is provided to the second horizontal interpolating part 42-2 through the HRAM 41, the second horizontal first/high order interpolating parts 42c and 42d respectively conducts horizontal first/high order interpolations according to the horizontal interpolating equations (equations 1~12) and provides results to the multiplexer 42-4. The multiplexer 42-4 selects interpolated horizontal/vertical convergence data in the underscan mode in response to a mode selecting signal (i.e., an underscan mode selecting signal) and provides them to the vertical interpolating part 44 through the VRAM 43. The vertical first order interpolating part 44a and the vertical high order interpolating part 44b in the vertical interpolating part 44 respectively conduct vertical first order and vertical high order interpolations for the vertical convergence data of the horizontally interpolated horizontal/vertical convergence data in the underscan mode according to the vertical interpolating equations (equations 13~19) and provides results to the D/A converting part 60.

When vertical/horizontal convergence adjustment point data in the 4:3 mode are provided to the third horizontal interpolating part 42-3 through the HRAM 41, the first horizontal first/high order interpolating parts 42e and 42f in the third horizontal interpolating part 42-3 respectively conduct horizontal first/high order interpolations according to the horizontal interpolating equations (equations 1~12) and provides results to the multiplexer 42-4. The multiplexer 42-4 selects the interpolated horizontal/vertical convergence data in the 4:3 mode in response to a mode selecting signal (i.e., a 4:3 mode selecting signal) and provides them to the vertical interpolating part 44 through the VRAM 43. For the horizontally interpolated horizontal/vertical convergence data in the 4:3 mode provided to the vertical first order interpolating part 44a and the vertical high order interpolating part 44b in the vertical interpolating part 44, vertical first/high order interpolations for the vertical convergence data are conducted according to the vertical interpolating equations (equations 13~19) and results provided to the D/A converting part 60. As operation hereafter are identical to the second related art device as shown in FIG. 4, further descriptions are omitted.

As described above, the related art horizontal/vertical interpolating device in the related art convergence systems has various problems. Since horizontal first order and high order interpolations are separately performed according to each of the three modes, a low processing efficiency problem results. Further, the horizontal/vertical interpolating device in the related art convergence system has a problem of having a complicated hardware system because a horizontal interpolation process for each mode is conducted by separate hardware systems.

SUMMARY OF THE INVENTION

An object of the present invention is to provide a horizontal/vertical interpolation device and method in a convergence system that substantially obviates one or more of the problems caused by limitations and disadvantages of the related art.

Another object of the present invention is to provide a horizontal/vertical interpolation device and method in a convergence system that processes a plurality of modes using a single horizontal interpolating block.

A further object of the present invention is to provide a horizontal/vertical interpolation device and method in a convergence system that processes horizontal interpolation using a less complex ASIC system.

A still further object of the present invention is to provide a horizontal/vertical interpolation device and method that performs power and processing efficient horizontal interpolation.

To achieve at least these and other advantages in a whole or in parts, and in accordance with the purpose of the present invention, as embodied and broadly described, a vertical/horizontal interpolation device and method in a convergence system includes a horizontal high order interpolating part for conducting horizontal high order interpolations for convergence adjustment data of preset positions of received horizontal/vertical convergence adjustment data regardless of the modes, an adjustment point processing part for processing adjustment point data for convergence adjustment data of the preset positions of the received horizontal/vertical convergence adjustment data, a first horizontal first order interpolating part for conducting horizontal first order interpolations for convergence adjustment data of the preset positions of the received horizontal/vertical convergence adjustment data in an overscan mode and a 4:3 mode, a second horizontal first order interpolating part for conducting horizontal first order interpolations for convergence adjustment data of the preset positions of the received horizontal/vertical convergence adjustment data in an underscan mode, and a vertical interpolation processing part for selecting an interpolated data in response to a mode selecting signal of interpolated data and conducting vertical first, and high order interpolations for the selected vertical interpolation data of the horizontal/vertical convergence interpolated data, which has been horizontally interpolated and adjustment point processed.

In another aspect of the present invention to further achieve the above objects, there is provided a method for conducting horizontal/vertical interpolation in a convergence system, including (1) a horizontal high order interpolating step for making horizontal high order interpolations of convergence adjustment data of preset positions of received horizontal/vertical convergence adjustment data regardless of modes, (2) a horizontal first order interpolating step for making horizontal first order interpolations of convergence adjustment data of preset positions of received horizontal/vertical convergence adjustment data regardless of modes, (3) an adjustment point processing step for subjecting convergence adjustment data of preset positions to adjustment point data processing of received horizontal/vertical convergence adjustment data regardless of modes, and (4) a step for making vertical interpolations of the horizontally interpolated data.

In yet another aspect of the present invention further to achieve the above objects, there is provided a method for conducting horizontal/vertical interpolation in a convergence system including (1) a horizontal high order interpolating step for making horizontal high order interpolations of convergence adjustment data of preset positions of received horizontal/vertical convergence adjustment data regardless of modes, (2) a horizontal first order interpolating step for making horizontal first order interpolations of convergence adjustment data of present positions or received horizontal/vertical convergence adjustment data regardless of modes, (3) an adjustment point processing step for subjecting convergence adjustment data of present positions to adjustment point data processing of received horizontal/vertical convergence adjustment data regardless of modes, (4) a step for subjecting the convergence adjustment data of the preset positions having first order interpolated to adjustment point processing again in the underscan mode, (5) a step for subjecting the convergence adjustment data of the preset positions which was first order interpolated to first order interpolation again to overwrite on the data an underscan mode, (6) a step for making vertical interpolations of the horizontally interpolated and adjustment point processed data.

In a further aspect of the present invention to achieve the above objects, there is provided a method for conducting horizontal/vertical interpolation in a convergence system including (1) a horizontal high order interpolating step for making horizontal high order interpolations of convergence adjustment data of preset positions of received horizontal/vertical convergence adjustment data regardless of modes, (2) a horizontal first order interpolating step for making horizontal first order interpolations of convergence adjustment data of preset positions of received horizontal/vertical convergence adjustment data regardless of modes, (3) an adjustment point processing step for subjecting convergence adjustment data of preset positions to adjustment point data processing of received horizontal/vertical convergence adjustment data regardless of modes, (4) a step for subjecting the convergence adjustment data of the preset positions having high order interpolated to adjustment point processing again in case a received mode is a 4:3 mode, and (5) a step for making vertical interpolations of the horizontally interpolated and adjustment point processed data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 7:
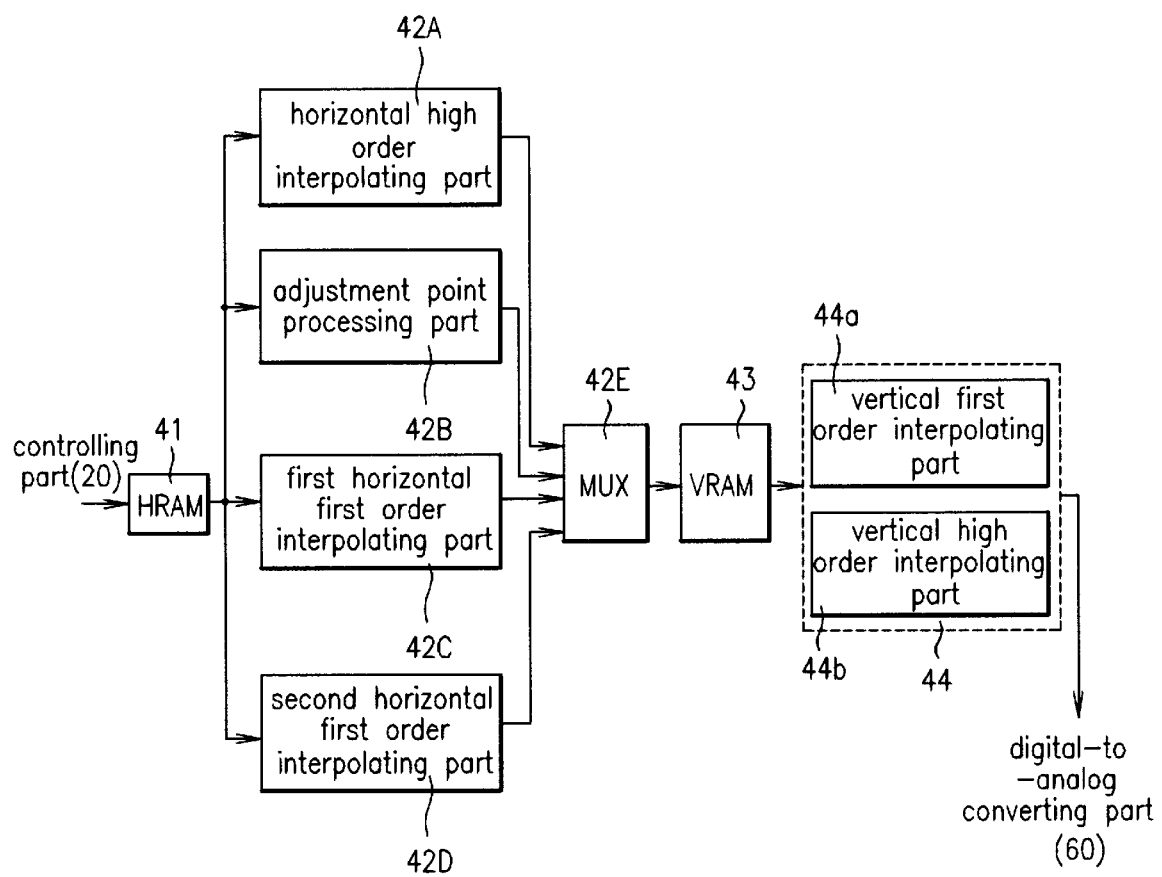
FIG. 7 is a block diagram that illustrates a convergence adjustment device in accordance with a preferred embodiment of the present invention showing horizontal/vertical interpolation process for each mode.

A convergence adjustment device in accordance with a preferred embodiment of the present invention is shown in FIG. 7. Descriptions for parts of the first preferred embodiment that are identical to the parts described in the related art are omitted.

The convergence adjustment device in accordance with the preferred embodiment of the present invention includes an HRAM 41 for storing adjustment point data, i.e., horizontal/vertical convergence adjustment data provided from a test pattern generating part 45. The convergence adjustment device in accordance with the preferred embodiment further includes a horizontal high order interpolating part 42A for conducting horizontal high order interpolation of the horizontal/vertical convergence adjustment data received through the HRAM 41 for preset positions regardless of the modes, an adjustment point processing part 42B for processing adjustment point data for the preset positions of the received horizontal/vertical convergence adjustment data and a first horizontal first order interpolating part 42C for conducting horizontal first order interpolations of the received horizontal/vertical convergence adjustment data for the preset positions in an overscan mode and a 4:3 mode. A second horizontal first order interpolating part 42D conducts horizontal first order interpolations of the received horizontal/vertical convergence adjustment data for the preset positions in an underscan mode. The convergence adjustment device of the preferred embodiment also includes a multiplexer 42E, a VRAM 43 and a vertical interpolating part 44. The multiplexer 42E provides relevant interpolated data of the interpolated data from the horizontal high order interpolating part 42A, the adjustment point processing part 42B, and the first horizontal first order interpolating part 42C and the second horizontal first order interpolating part 42D in response to a mode selecting signal. The multiplexer 42E provides the relevant horizontally interpolated data to the VRAM 43 and the vertical interpolating part 44.

Operations of the preferred embodiment of a convergence adjustment device will now be described. Operations of the preferred embodiment will initially be described mode by mode.

Figure 1:
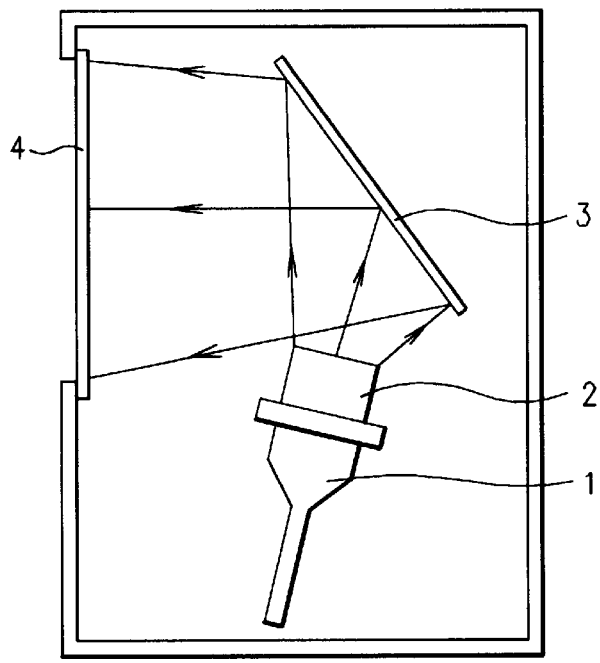
FIG. 1 is a block diagram that illustrates a related art projection monitor.
Figure 2:
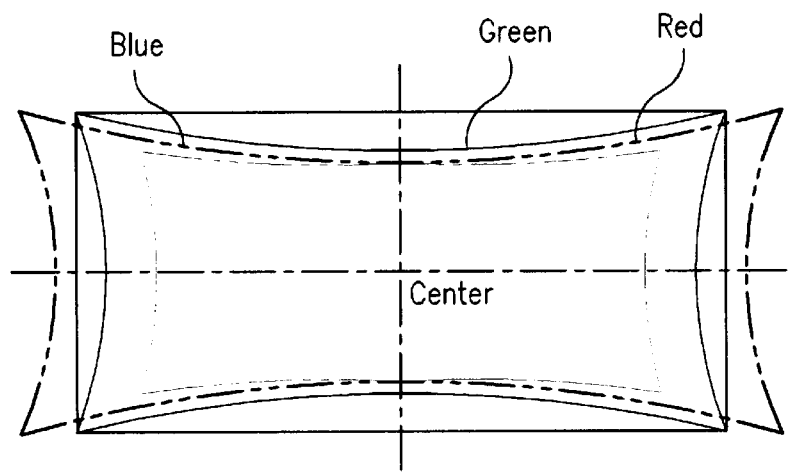
FIG. 2 is a diagram that illustrates R, G and B misconvergences in a related art projection monitor.
Figure 3:
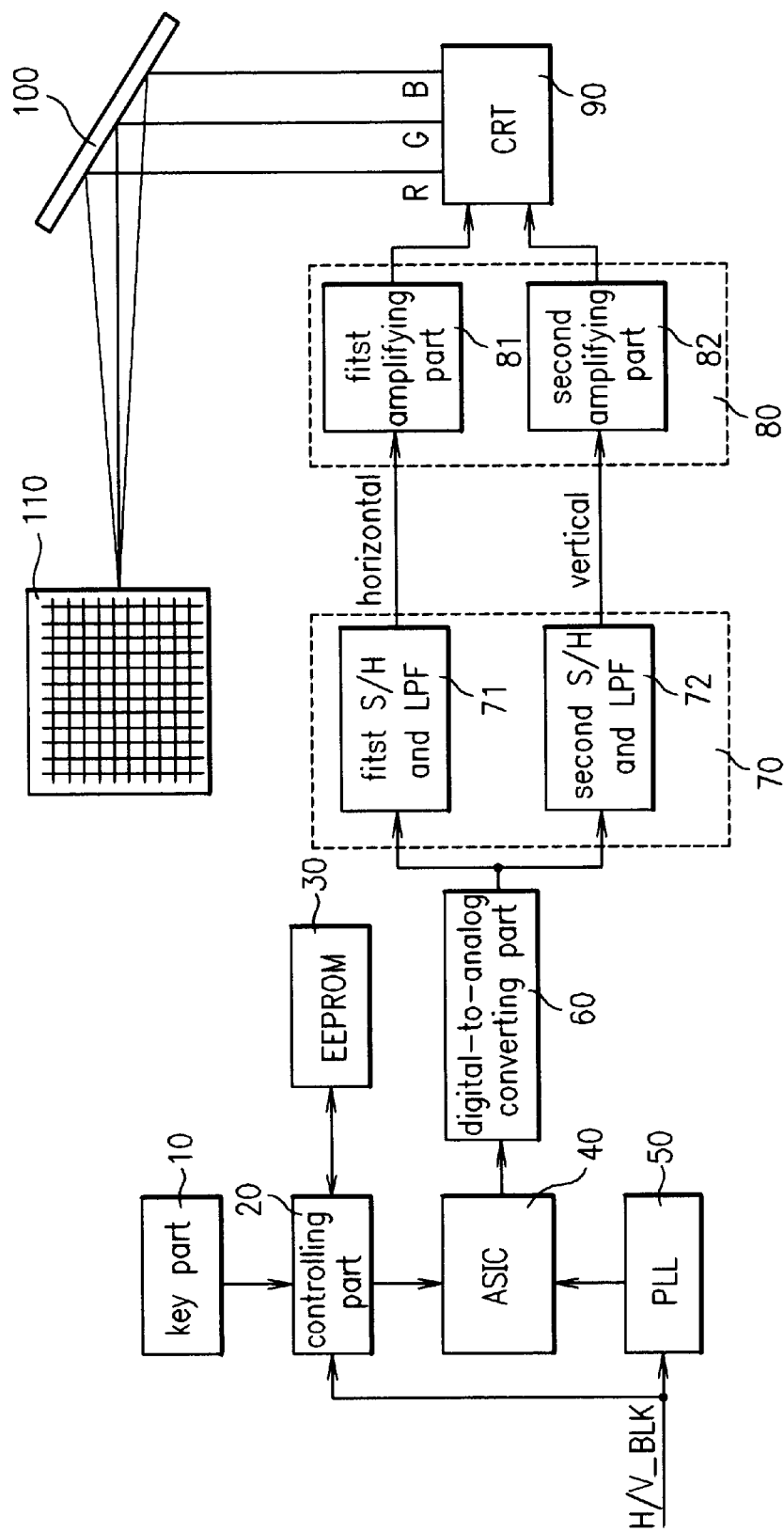
FIG. 3 is a block diagram that illustrates a related art convergence system in a projection monitor.
Figure 4:
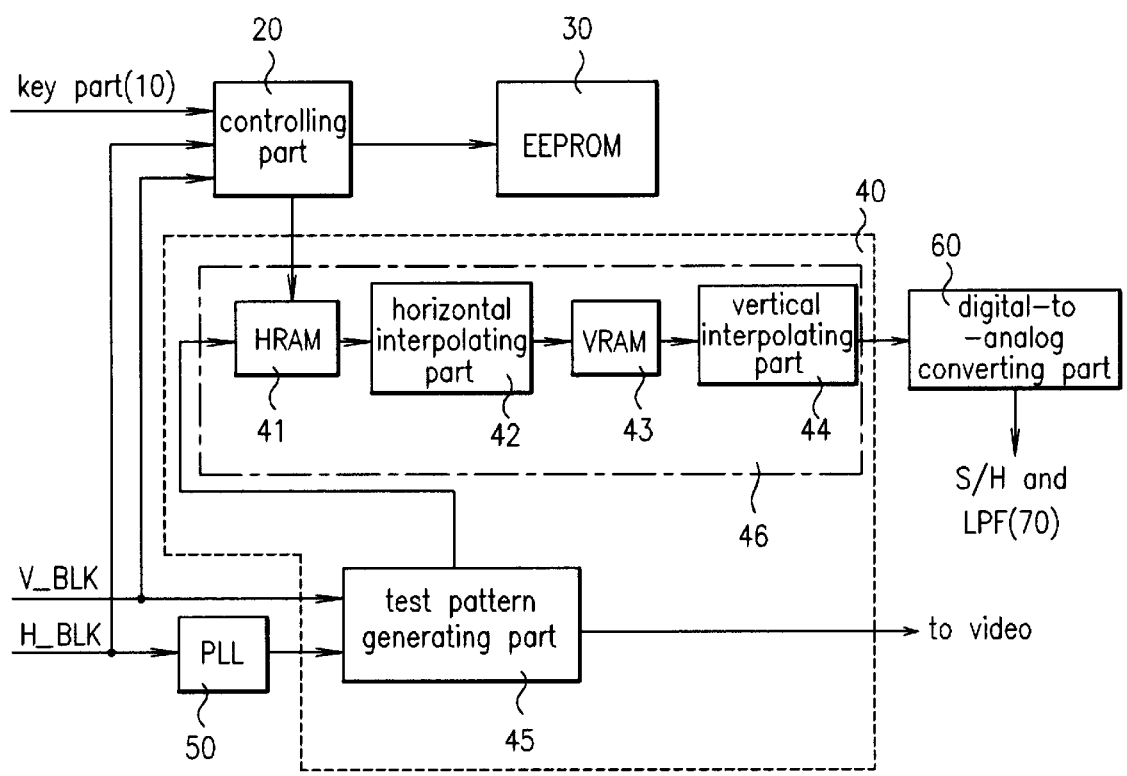
FIG. 4 is a diagram that illustrates an ASIC shown in FIG. 3.
Figure 5A:
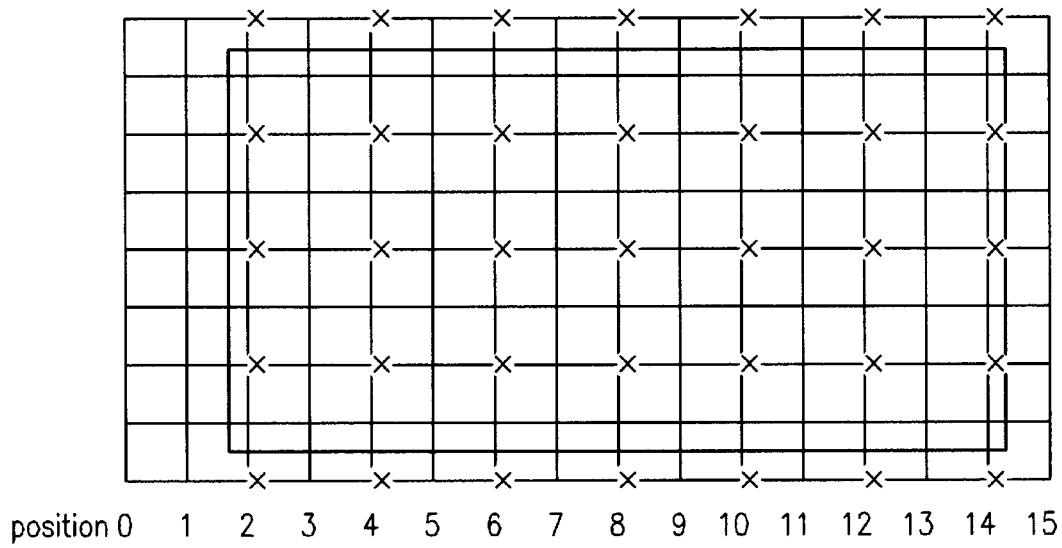
FIGS. 5a~5d are diagrams that illustrate test patterns for various modes.

In an overscan mode, upon receipt of horizontal/vertical convergence adjustment data as shown in FIG. 5a generated in the test pattern generating part 45 of FIG. 4 through the HRAM 41, the horizontal high order interpolating part 42A conducts horizontal high order interpolations for positions 3, 5, 7, 9, 11 and 13 according to equations (1)–(8). The horizontal first order interpolating part 42C conducts horizontal first order interpolations for positions 0, 1 and 15 according to equations (9)–(11), and the adjustment point processing part 42B processes adjustment points for positions 2, 4, 6, 8, 10, 12 and 14, which are then provided to the multiplexer 42E. Then, the multiplexer 42E selects data from the horizontal high/first order interpolated data and the adjustment point processed data in a response to a received overscan mode selecting signal. The data selected by the multiplexer 42E is applied to the vertical interpolating part 44 through the VRAM 43 and subjected to vertical interpolations at the vertical first, and high order interpolating parts 44a and 44b.

Figure 5B:
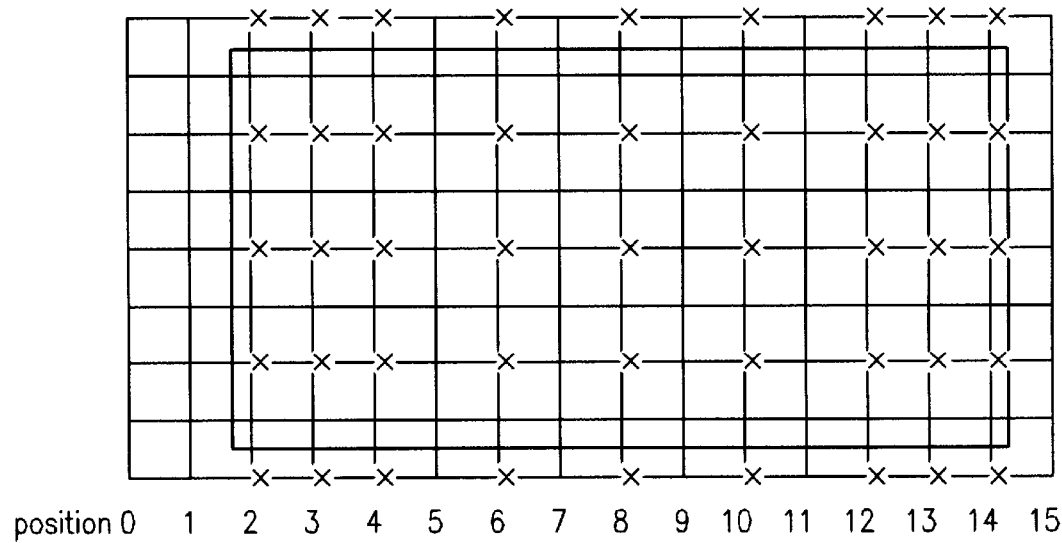
Figure 5C:
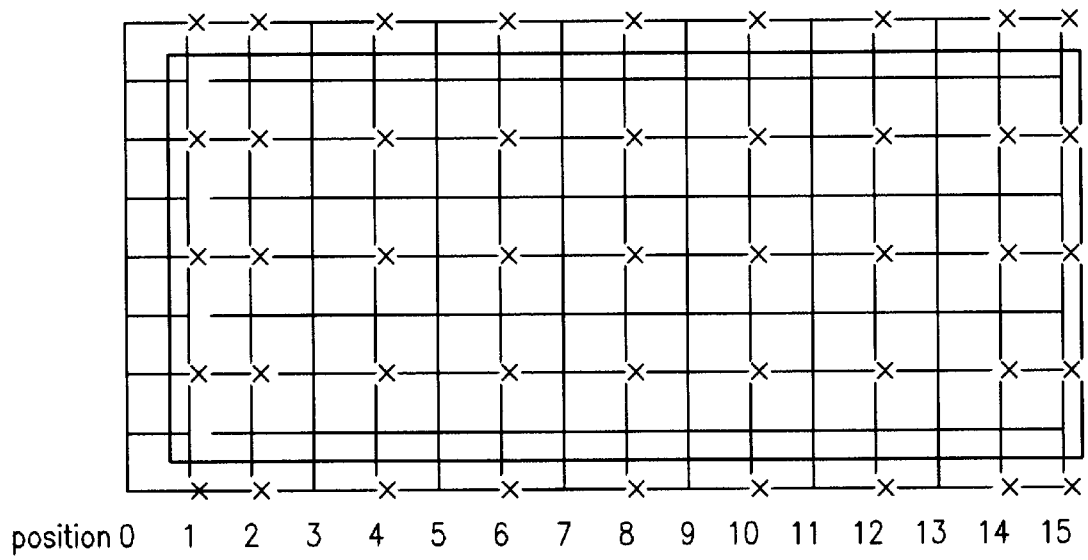
Figure 5D:
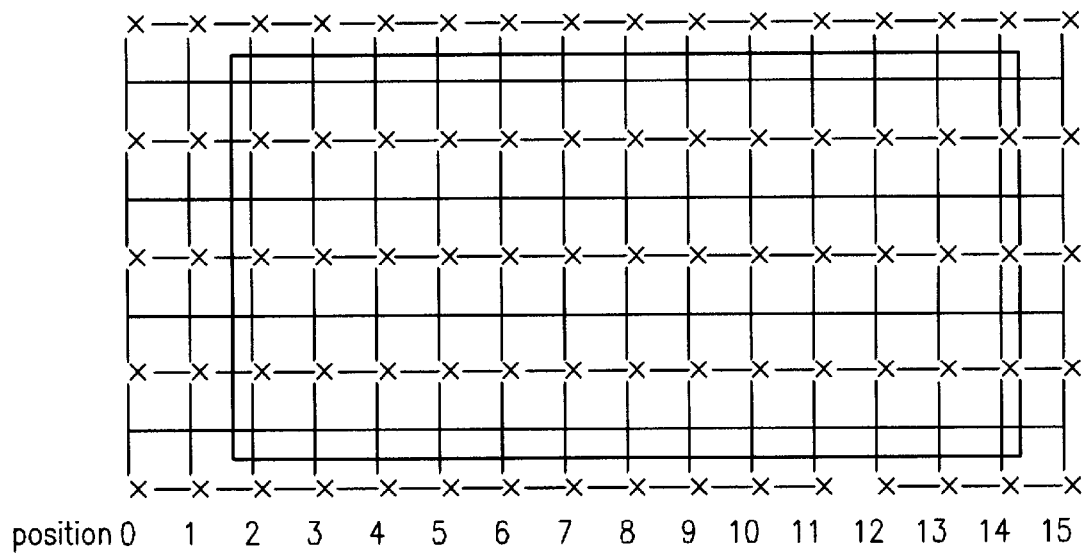
Figure 6:
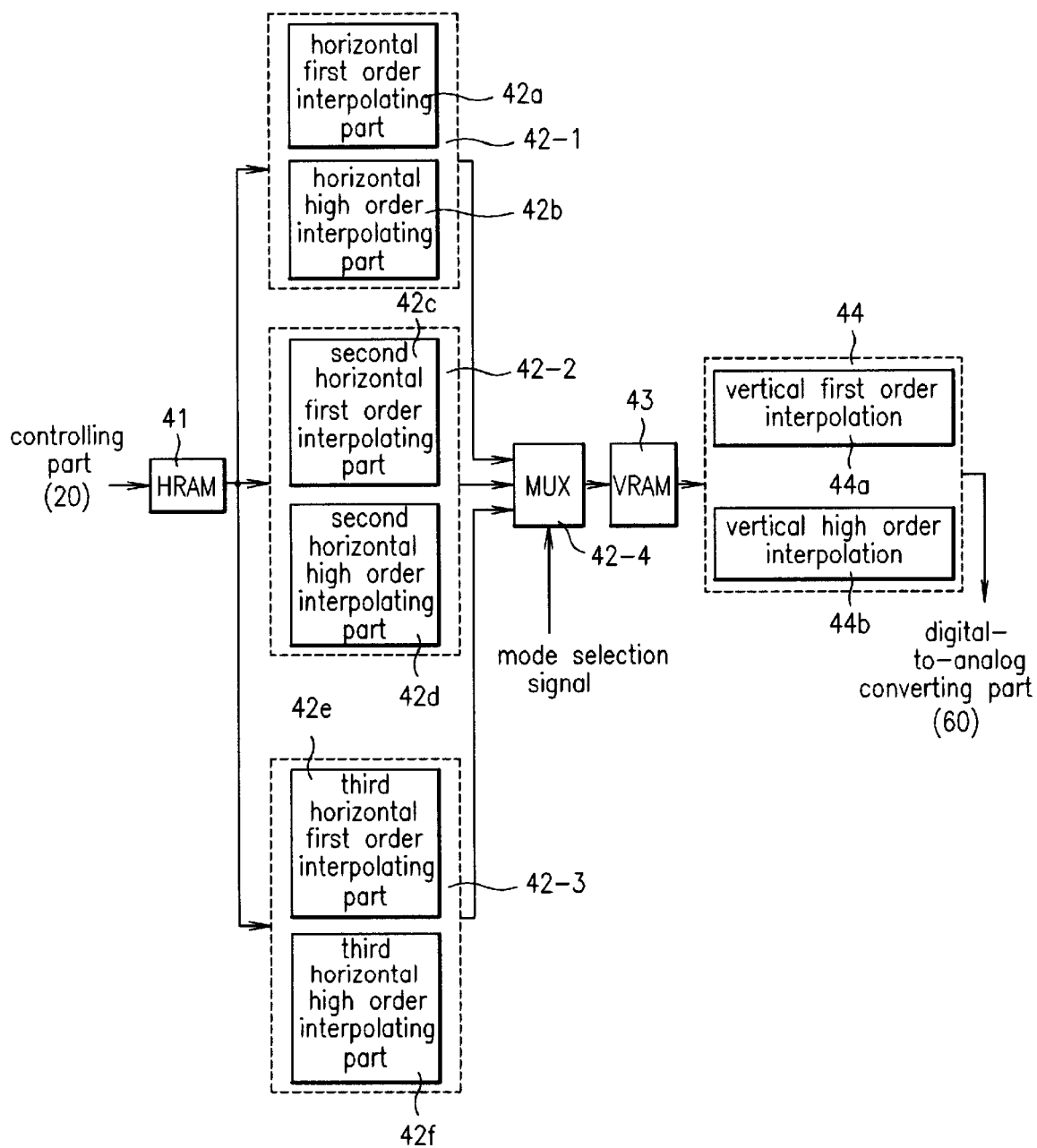
FIG. 6 is a block diagram that illustrates a related art convergence adjustment device showing a horizontal/vertical interpolation process for each mode.

In an underscan mode, upon receipt of horizontal/vertical convergence adjustment data as shown in FIG. 5c generated in the test pattern generating part 45 of FIG. 4 through the HRAM 41, the horizontal high order interpolating part 42A conducts horizontal high order interpolations for positions 3, 5, 7, 9, 11 and 13 according to equations (1)–(8). The second horizontal first order interpolating part 42D conducts a horizontal first order interpolation for position 0 according to equation (12), and the adjustment point processing part 42B processes adjustment points for positions 2, 4, 6, 8, 10, 12 and 14. The results from the horizontal high order interpolating parts 42A, the second horizontal first order interpolating part 42D and the adjustment point processing part 42B are then provided to the multiplexer 42E. In addition to this, the adjustment point processing part 42B overwrites for the processed positions for positions 1 and 15. Then, the multiplexer 42E selects data from the interpolated data and the adjustment point processed data in response to a underscan mode selecting signal. The selected data is applied to the vertical interpolating part 44 through the VRAM 43 and subjected to vertical interpolations at the vertical first, and high order interpolating parts 44a and 44b.

In a 4:3 mode, upon receipt of horizontal/vertical convergence adjustment data as shown in FIG. 5b generated in the test pattern generating part 45 of FIG. 4 through the HRAM 41, the horizontal high order interpolating part 42A conducts horizontal high order interpolations for positions 3, 5, 7, 9, 11 and 13 according to equations (1)–(8). The first horizontal first order interpolating part 42C conducts a horizontal first order interpolation for positions 0, 1 and 15 according to equations (9)–(12), and the adjustment point processing part 42B processes adjustment points for positions 2, 4, 6, 8, 10, 12 and 14, which are then provided to the multiplexer 42E. In addition to this, the adjustment point processing part 42B overwrites for the processed positions for positions 3 and 13. Then, the multiplexer 42E selects data from the interpolated data and the adjustment point processed data in response to a 4:3 mode selecting signal. The selected data is applied to the vertical interpolating part 44 through the VRAM 43 and subjected to vertical interpolations at the vertical first and high order interpolating parts 44a and 44b.

In accordance with the preferred embodiments of the present invention, the three modes are preferably processed as follows:

| | |
|---|---|
| First step: Positions 3, 5, 7, 9, 11 and 13 | high order interpolation; |
| Second step: Positions 0, 1 and 15 | first order interpolation; |
| Third step: Positions 2, 4, 6, 8, 10, 12 and 14 and | adjustment point processing; |
| Fourth step: Overscan mode | No more processing, |
| Underscan mode: positions 1 and 15 and | adjustment point processing |
| 4:3 mode: positions 3 and 13 | adjustment point processing. |

That is, in the horizontal interpolation for each mode, selected positions processed already can be processed again and an overwrite occurs for a horizontal interpolation data of the selected position. For example, in the underscan mode, the positions 0, 1 and 15 are overwritten by making first order interpolation of the positions 0, 1 and 15 according to equations (9)–(11) in the second step. Then, in the fourth step of the underscan mode, adjustment point processing of the positions 1 and 15 is performed again and first order interpolation of the position 0 is performed again according to equation (12). In the 4:3 mode, positions 3 and 13 are high order interpolated in the first step and overwritten by adjustment point processing in the fourth step. Data are preferably processed in the following sequence in the preferred embodiment of the present invention, $y_3$, $y_5$, $y_7$, $y_9$, $y_{11}$ and $y_{13}$ are high order interpolated and then $y_0$, $y_1$ and $y_{15}$ are first order interpolated. Next $y_2$, $y_4$, $y_6$, $y_8$, $y_{10}$, $y_{12}$ and $y_{14}$ are adjustment point processed and then $y_1/y_3$, $/y_{15}/y_{13}$ and $y_0$ are first order interpolated and adjustment point processed according to each mode.

As described above, the preferred embodiment of the convergence adjustment device according to the present invention have various advantages. By processing modes (e.g., overscan, underscan and 4:3) with a single unit or circuit, the preferred embodiment does not need separate horizontal interpolating blocks to process separate modes like the three separate horizontal interpolating blocks (i.e., one block per mode) of the related art. Thus, the preferred embodiment does not need the size or complexity required by the related art. The size of the single unit or circuit of the preferred embodiment is approximately the size, for example, of the related art horizontal interpolating block for processing an underscan mode. The vertical/horizontal interpolation device and method in a convergence system according to the preferred embodiment of the present invention allows a less complex ASIC system, and an power and processing efficient horizontal interpolation.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A vertical/horizontal interpolation device for use in a convergence system of a projection monitor having a plurality of modes, wherein the vertical/horizontal interpolation device receives one of a plurality of mode-specific sets of horizontal/vertical convergence adjustment data, comprising:

a horizontal high order interpolating device that performs horizontal high order interpolations to determine first convergence adjustment data of a plurality prescribed positions using the received horizontal/vertical convergence adjustment data regardless of a selected mode;

an adjustment point processing device that performs adjustment point processing to determine second convergence adjustment data of the prescribed positions using the received horizontal/vertical convergence adjustment data regardless of the selected mode;

a first horizontal first order interpolating device that performs horizontal first order interpolations to determine third convergence adjustment data of the prescribed positions using the received horizontal/vertical convergence adjustment data in a first mode;

a second horizontal first order interpolating device that performs the horizontal first order interpolations to determine the third convergence adjustment positions of the prescribed positions using the received horizontal/vertical convergence adjustment data in a second mode; and a vertical interpolation processing device that selects horizontal interpolated data of the prescribed positions from the devices and performs vertical interpolations for the horizontally interpolated and adjustment point processed selected horizontal interpolated data.

2. The vertical/horizontal interpolation device of claim 1, wherein the plurality of prescribed positions is 0 through 15, wherein the first convergence adjustment data includes positions 3, 5, 7, 9, 11 and 13 of the prescribed positions, wherein the plurality of modes are overscan, underscan and 4:3 modes, respectively, and wherein the prescribed positions comprise correction data for a horizontal row of a display in the projection monitor.

3. The vertical/horizontal interpolation device as of claim 1, wherein the second convergence adjustment data includes positions 2, 4, 6, 8, 10, 12 and 14.

4. The vertical/horizontal interpolation device of claim 1, wherein the third convergence adjustment data includes positions 0, 1, and 15.

5. The vertical/horizontal interpolation device of claim 4, wherein the adjustment point processing device performs adjustment point processing on the first order interpolated third convergence adjustment data in the second mode.

6. The vertical/horizontal interpolation device of claim 5, wherein the adjustment point processing device performs processing on the 1 and 15 positions.

7. The vertical/horizontal interpolation device of claim 1, wherein the third convergence adjustment data includes position 0 for the second horizontal first order interpolating device.

8. The vertical/horizontal interpolation device of claim 1, wherein the adjustment point processing device performs adjustment point processing on the high order interpolated first convergence adjustment data in a third mode.

9. The vertical/horizontal interpolation device of claim 8, wherein the adjustment point processing device performs processing on positions 3 and 13 of the plurality of prescribed positions.

10. A method for performing horizontal/vertical interpolation in a convergence system for a plurality of modes, comprising:

(a) horizontal high order interpolating convergence adjustment data of a first set of prescribed positions using received horizontal/vertical convergence adjustment data regardless of a selected one of the plurality of modes;

(b) horizontal first order interpolating convergence adjustment data of a second set of prescribed positions using the received horizontal/vertical convergence adjustment data regardless of the selected mode;

(c) adjustment point processing convergence adjustment data of a third set of prescribed positions using the received horizontal/vertical convergence adjustment data regardless of the selected mode; and (d) vertical interpolating the horizontally interpolated data.

11. The method of claim 10, wherein the prescribed positions are 0 through 15 and the first set of prescribed positions are 3, 5, 7, 9, 11 and 13 in the horizontal high order interpolating step.

12. The method of claim 10, wherein the second set of prescribed positions are 2, 4, 6, 8, 10, 12 and 14 in the adjustment point processing step.

13. The method of claim 10, wherein the third set of prescribed positions are 0, 1 and 15 in the first horizontal interpolating step.

14. The method of claim 10, wherein the horizontal interpolation is completed by the steps of (a)~(c) when a selected mode is an overscan mode.

15. A method for performing horizontal/vertical interpolation in a convergence system, comprising:

(a) horizontal high order interpolating step for making horizontal high order interpolations of convergence adjustment data of first prescribed positions of received horizontal/vertical convergence adjustment data regardless of modes;

(b) a first horizontal first order interpolating step for making horizontal first order interpolations of convergence adjustment data of second prescribed positions of the received horizontal/vertical convergence adjustment data regardless of modes;

(c) a first adjustment point processing step for subjecting convergence adjustment data of third prescribed positions to adjustment point data processing of the received horizontal/vertical convergence adjustment data regardless of modes, wherein the first, second and third prescribed positions constitute data for a horizontal row, wherein the data are used to prepare a correction waveform;

(d) a second adjustment point processing step for overwriting a subset of the second prescribed positions using adjustment point processing in a first mode and for overwriting a subset of the first prescribed positions using adjustment point processing in a second mode; and, (e) a vertical interpolating step for vertically interpolating the horizontally interpolated and adjustment point processed data.

16. The method of claim 15, wherein the first prescribed positions are 3, 5, 7 9, 11 and 13 in the horizontal high order interpolating step.

17. The method of claim 15, wherein the third prescribed positions are 2, 4, 6, 8, 10, 12 and 14 in the adjustment point processing step.

18. The method of claim 15, wherein the second prescribed positions are 0, 1 and 15 in the first horizontal first order interpolating step.

19. The method of claim 15, wherein the one subset of the second prescribed positions are 1 and 15 and the second subset of the second prescribed positions is position 0.

20. The method of claim 15, wherein the horizontal interpolation is completed by step (d) in a third mode.

21. A method for conducting horizontal/vertical interpolation for a plurality of modes in a convergence system, comprising:

(a) receiving horizontal/vertical convergence data based on a selected mode;

(b) horizontal high order interpolating first convergence adjustment data regardless of the selected mode;

(c) horizontal first order interpolating second convergence adjustment data regardless the selected mode; and (d) first adjustment point processing third convergence adjustment data regardless of the selected mode, wherein the first, second and third convergence adjustment data comprise a set of horizontal convergence adjustment data for the convergence system;

(e) a re-processing step that repeats at least one of the steps (a), (b) and (c) on a substep of the set of horizontal convergence adjustment data in one mode of the plurality of modes; and (f) vertical interpolating the horizontally interpolated and adjustment point processed data.

22. The method of claim 21, wherein the first convergence adjustment data includes positions 3, 5, 7, 9, 11 and 13 of a set of 0 to 15 prescribed positions.

23. The method of claim 22, wherein the subset of the first convergence adjustment data includes positions 3 and 13 of the convergence adjustment data.

24. The method of claim 21, wherein the convergence adjustment data includes positions 2, 4, 6, 8, 10, 12 and 14.

25. The method of claim 21, wherein the re-processing step performs second adjustment point processing of a subset of the horizontal high order interpolated first convergence adjustment data in a first mode.

* * * * *